United States Patent

Reichert

(10) Patent No.: US 6,307,034 B1
(45) Date of Patent: Oct. 23, 2001

(54) REACTIVE DYES CONTAINING A FORMAZAN DYE RADICAL AND MONOAZO DYE RADICAL, A PROCESS FOR THEIR PREPARATION AND THEIR USE

(75) Inventor: Hans Reichert, Rheinfelden (DE)

(73) Assignee: Ciba Specialty Chemicals Corporation, Tarrytown, NJ (US)

( * ) Notice: Subject to any disclaimer, the term of this patent is extended or adjusted under 35 U.S.C. 154(b) by 0 days.

(21) Appl. No.: 09/669,465

(22) Filed: Sep. 25, 2000

(30) Foreign Application Priority Data

Sep. 30, 1999 (CH) .................................................. 1794/99

(51) Int. Cl.$^7$ ............................. C09B 62/04; D06P 1/382
(52) U.S. Cl. ............................................. 534/618; 8/549
(58) Field of Search ............................................. 534/618

(56) References Cited

U.S. PATENT DOCUMENTS

| 5,232,462 | 8/1993 | Tzikas ........................................ 8/549 |
| 5,684,138 | * 11/1997 | Klier et al. ............................ 534/612 |
| 5,931,975 | * 8/1999 | Muller et al. ............................. 8/549 |

FOREIGN PATENT DOCUMENTS 2085908  5/1982  (GB).

* cited by examiner

*Primary Examiner*—Fiona T. Powers
(74) *Attorney, Agent, or Firm*—Kevin T. Mansfield

(57) ABSTRACT

Reactive dyes of formula (1)

(1)

wherein
  $R_1$, $R_2$, $R_3$ and $R_4$ are each independently of the others hydrogen or unsubstituted or substituted $C_1$–$C_4$alkyl,
  $X_1$ and $X_2$ are halogen,
  B is a $C_2$–$C_{12}$alkylene radical which may be interrupted by 1, 2 or 3 —O— members and is unsubstituted or substituted by hydroxy, A is a formazan radical of formula (2) or (3)

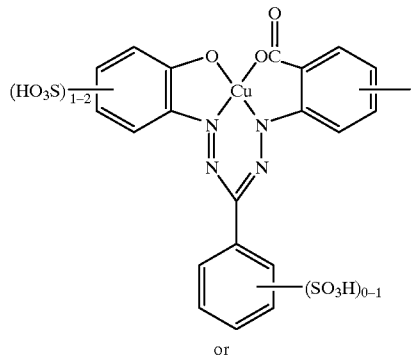

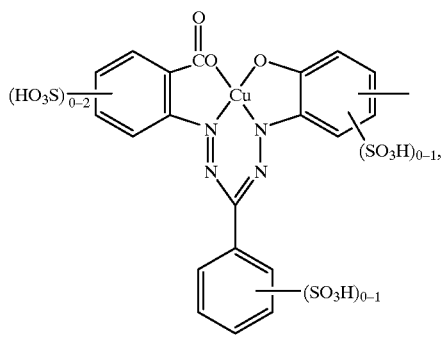

D is a radical of formula (4) or (5)

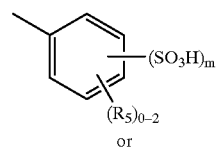

or

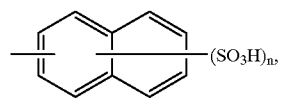

wherein m, n and $R_5$ are as defined in the claims are suitable especially for dyeing or printing hydroxy-group-containing or nitrogen-containing fiber materials. Olive-green dyeings are obtained having good fastness properties and a high tinctorial yield.

11 Claims, No Drawings

REACTIVE DYES CONTAINING A FORMAZAN DYE RADICAL AND MONOAZO DYE RADICAL, A PROCESS FOR THEIR PREPARATION AND THEIR USE

The present invention relates to novel olive-green reactive dyes containing a formazan dye radical and a monoazo dye radical, to a process for their preparation and to their use in the dyeing or printing of textile fibre materials.

The practice of dyeing using reactive dyes has recently led to higher demands being made on the quality of the dyeings and the profitability of the dyeing process. As a result, there is still a need for novel reactive dyes having improved properties, for example in respect of their application.

Dyeing nowadays requires reactive dyes that have sufficient substantivity and at the same have good ease of washing off of unfixed dye. They should also have a good tinctorial yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes having the qualities characterised above to a high degree. The novel dyes should especially be distinguished by high fixing yields and high fibre-dye binding stability; it should also be possible for dye that is not fixed to the fibre to be washed off easily. The dyes should also yield dyeings having good allround properties, for example fastness to light and to wetting.

It has been shown that the problem posed is largely solved by the novel olive-green reactive dyes defined below.

The present invention accordingly relates to reactive dyes of formula (1)

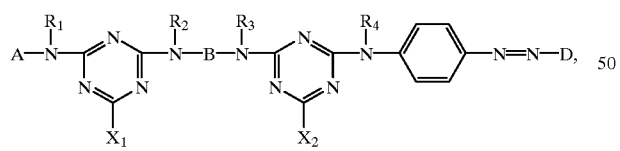

(1)

wherein $R_1$, $R_2$, $R_3$ and $R_4$ are each independently of the others hydrogen or unsubstituted or substituted $C_1$–$C_4$alkyl, $X_1$ and $X_2$ are halogen, B is a $C_2$–$C_{12}$alkylene radical which may be interrupted by 1, 2 or 3 —O— members and is unsubstituted or substituted by hydroxy, A is a formazan radical of formula (2) or (3)

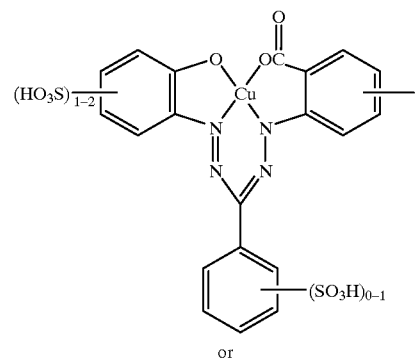

(2)

or

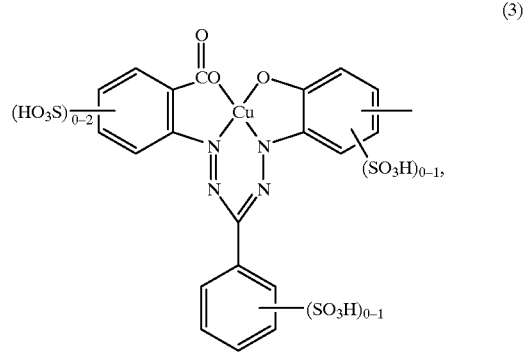

(3)

D is a radical of formula (4) or (5)

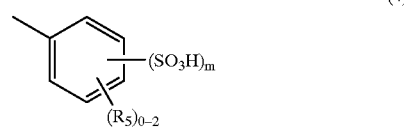

(4)

or

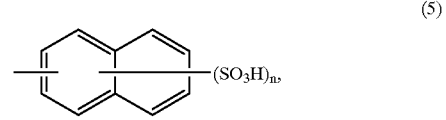

(5)

wherein m is the number 1 or 2, n is the number 1, 2 or 3, and $(R_5)_{0-2}$ denotes from 0 to 2 identical or different substituents from the group $C_1$–$C_4$alkyl, $C_1$–$C_4$alkoxy, $C_2$–$C_4$alkanoylamino and halogen.

The radicals $R_1$, $R_2$, $R_3$ and $R_4$ in the reactive dye of formula (1) as alkyl radicals are straight-chain or branched. The alkyl radicals may be further substituted, for example by hydroxy, sulfo, sulfato, cyano or by carboxy. The following radicals may be mentioned by way of example: methyl, ethyl, propyl, isopropyl, butyl, isobutyl, sec-butyl and tert-butyl, and also the corresponding hydroxy-, sulfo-, sulfato-, cyano- or carboxy-substituted radicals. Preferred as substituents are hydroxy, sulfo and sulfato, especially hydroxy and sulfato, and preferably hydroxy.

$R_1$ and $R_4$ are preferably hydrogen or $C_1$–$C_4$alkyl, especially hydrogen.

$R_2$ and $R_3$ are preferably each independently of the other hydrogen or unsubstituted or hydroxy-, sulfo-, sulfato-, cyano- or carboxy-substituted $C_1$–$C_4$alkyl. According to an embodiment of interest, one of the radicals $R_2$ and $R_3$ is hydroxy-, sulfo-, sulfato-, cyano- or carboxy-substituted $C_1$–$C_4$alkyl, and the other of the radicals $R_2$ and $R_3$ is hydrogen or $C_1$–$C_4$alkyl, especially hydrogen.

$R_2$ and $R_3$ are especially preferably each independently of the other hydrogen or $C_1$–$C_4$alkyl, especially hydrogen.

As $C_1$–$C_4$alkyl for $R_5$, each independently of any other, there come into consideration, for example, methyl, ethyl, propyl, isopropyl, butyl, sec-butyl, tert-butyl or isobutyl, preferably methyl or ethyl and especially methyl.

As $C_1$–$C_4$alkoxy for $R_5$, each independently of any other, there come into consideration, for example, methoxy, ethoxy, propoxy, isopropoxy, butoxy or isobutoxy, preferably methoxy or ethoxy and especially methoxy.

As $C_2$–$C_4$alkanoylamino for $R_5$, each independently of any other, there come into consideration, for example, acetylamino or propionylamino and especially acetylamino.

As halogen for $R_5$, each independently of any other, there come into consideration, for example, fluorine, chlorine or bromine, preferably chlorine or bromine and especially chlorine.

$R_5$ is preferably hydrogen or a substituent from the group $C_1$–$C_4$alkyl, $C_1$–$C_4$alkoxy and halogen.

$X_1$ and $X_2$ are preferably each independently of the other chlorine or fluorine, especially fluorine.

B is preferably a $C_2$–$C_6$alkylene radical which may be interrupted by 1 or 2 —O— members and is unsubstituted or substituted by hydroxy.

Of particular interest as bridge members B are $C_2$–$C_6$alkylene radicals, especially those of formula —$CH_2$—CH($R_6$)— or —($R_6$)CH—$CH_2$—, wherein $R_6$ is $C_1$–$C_4$alkyl, especially methyl, and very especially 1,2-propylene.

A suitable formazan radical A of formula (2) is, for example, a radical of formula

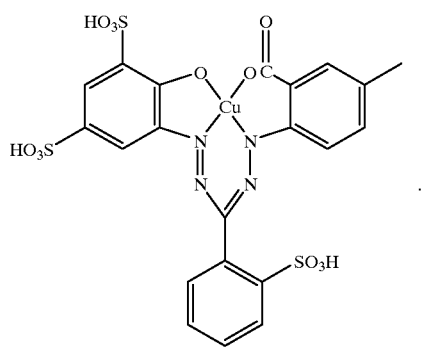

(2.1)

A suitable formazan radical A of formula (3) is, for example, a radical of formula

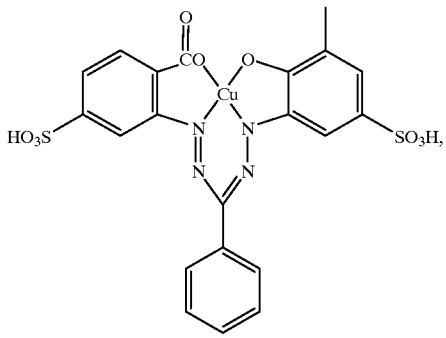

(3.1)

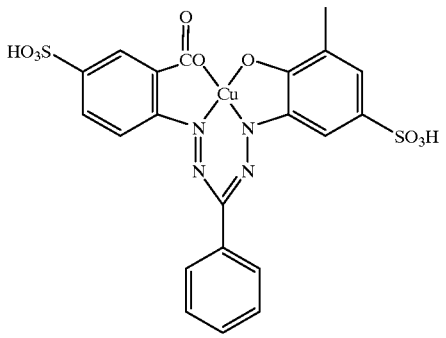

(3.2)

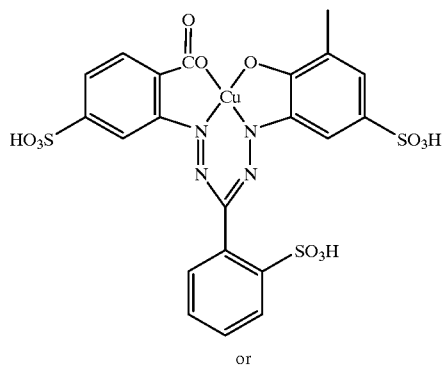

(3.3)

or

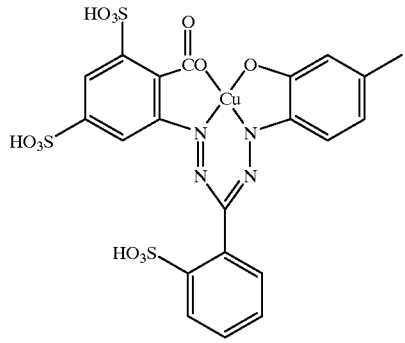

(3.4)

Preference is given to the reactive dyes according to the invention wherein the formazan radical A corresponds to a radical of formula (3.1).

In the reactive dyes according to the invention, D as a radical of formula (4) is, for example, a radical of formula (4.1) 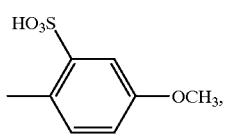
(4.2) 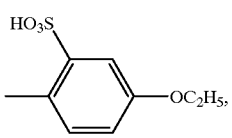
(4.3) 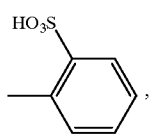
(4.4) 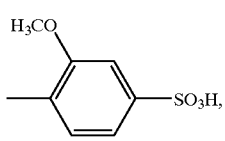
(4.5) 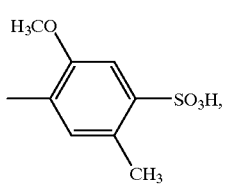
(4.6) 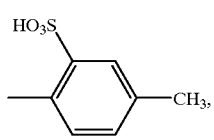
(4.7) 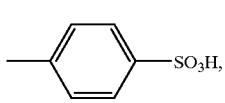
(4.8) 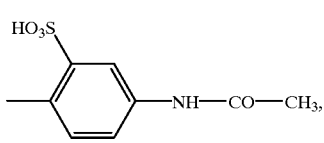
(4.9) 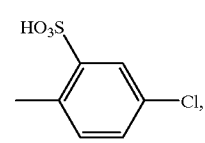
(4.10) 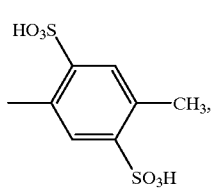
(4.11) 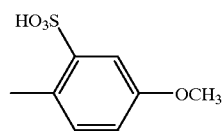
or
(4.12) 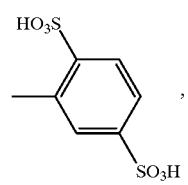
preferably of formula (4.1), (4.3), (4.6), (4.10), (4.11) or (4.12).
In the dye mixtures according to the invention, D as a radical of formula (5) is, for example, a radical of formula
(5.1) 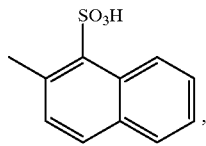
(5.2) 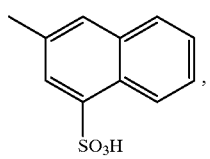
(5.3) 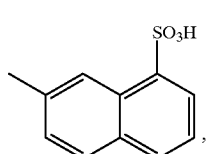
(5.4) 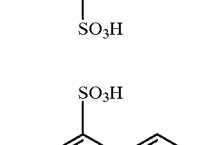
(5.5) 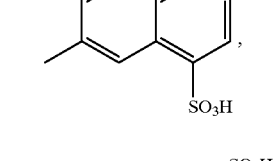

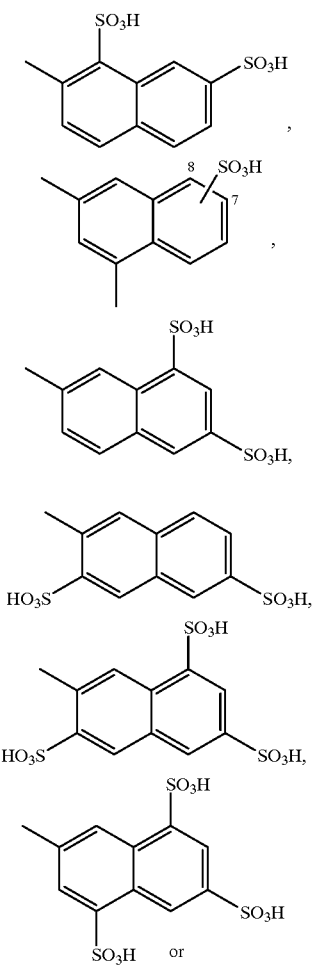

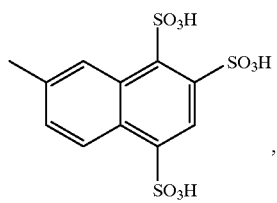

especially of formula (5.11).

Preference is given to the reactive dyes according to the invention wherein D is a radical of formula (5a)

(5a)

wherein n is the number 2 or 3.

In a preferred embodiment of the reactive dyes of formula (1) according to the invention $R_1$, $R_2$, $R_3$ and $R_4$ are hydrogen, $X_1$ and $X_2$ are chlorine or fluorine, B is a radical of formula —$CH_2$—$CH(R_6)$— or —$(R_6)$CH—$CH_2$—, wherein $R_6$ is $C_1$–$C_4$alkyl, especially methyl, A is a radical of formula (3.1), D is a radical of formula (5a), wherein n is the number 2 or 3.

In an especially preferred embodiment the reactive dyes of formula (1) according to the invention correspond to a dye of formula (1.1)

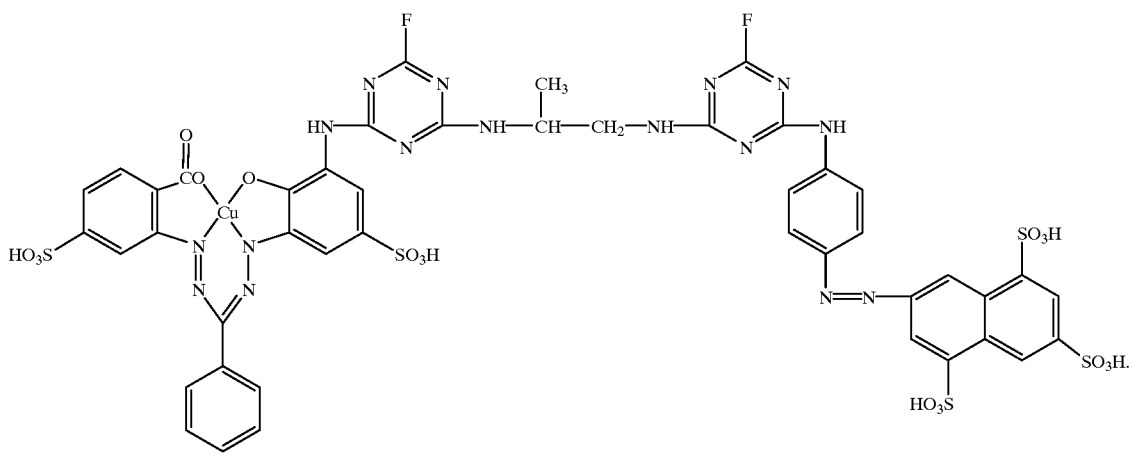

The present invention relates also to a process for the preparation of reactive dyes of formula (1), which process comprises condensing a compound of formula (6a)

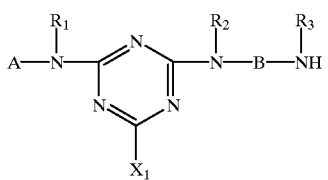

(6a)

with a compound of formula (7a)

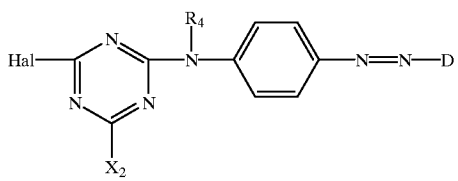

(7a)

or condensing a compound of formula (6b)

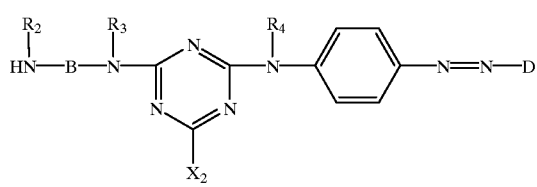

(6b)

with a compound of formula (7b)

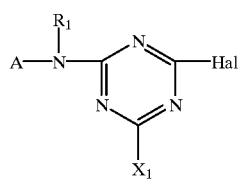

(7b)

wherein Hal is halogen, and the definitions and preferred meanings given above for A, B, $X_1$, $X_2$, $R_1$, $R_2$, $R_3$ and $R_4$ apply.

Compounds of formulae (7a) and (7b) can be obtained, for example, by condensing compounds of formula (8a) or (8b)

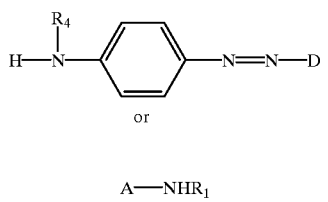

(8a)

or

A—NHR$_1$  (8b)

with cyanuric chloride or cyanuric fluoride. Compounds of formulae (6a) and (6b) can be obtained by condensing a compound of formula (7b) or (7a) with a diamine of formula $R_2$—HN—B—NH—$R_3$, an excess of the diamine optionally being used.

The compounds of formulae (8a) and (8b) are known or can be obtained analogously to known compounds.

The individual condensation reactions can be carried out according to processes known per se, for example according to the processes described in GB-A-2 085 908. The condensation reactions are generally carried out in an aqueous solution, at a temperature of, for example, from 0 to 50° and a pH value of, for example, from 4 to 9.

The reactive dyes of formula (1) according to the invention that contain a sulfo or sulfato group are either in the form of the free acid thereof or preferably in the form of the salt thereof. Suitable salts are, for example, alkali metal, alkaline earth metal or ammonium salts or salts of an organic amine. There may be mentioned by way of example sodium, lithium, potassium or ammonium salts or the salt of mono-, di- or tri-ethanolamine.

The reactive dyes according to the invention are suitable for dyeing and printing a wide variety of materials, such as hydroxy-group-containing or nitrogen-containing fibre materials. There may be mentioned by way of example silk, leather, wool, polyamide fibres and polyurethanes, and especially all types of cellulosic fibre materials. Such cellulosic fibre materials are, for example, natural cellulose fibres, such as cotton, linen and hemp, and cellulose and regenerated cellulose. The dyes according to the invention are also suitable for dyeing or printing hydroxy-group-containing fibres contained in blend fabrics, for example blends of cotton and polyester fibres or polyamide fibres. The dyes according to the invention are especially suitable for dyeing or printing cellulosic fibre materials. They can also be used for dyeing or printing natural or synthetic polyamide fibre materials.

The dyes according to the invention can be applied to the fibre material and fixed to the fibre in a number of ways, especially in the form of an aqueous dye solution or dye print paste. They are suitable for the exhaust process and also for dyeing using the pad-dyeing process, according to which the goods are impregnated with aqueous, optionally salt-containing, dye solutions, and the dyes are fixed following an alkali treatment or in the presence of alkali, optionally with heating. They are especially suitable for the so-called cold pad-batch process, according to which the dye together with the alkali is applied on the pad and is thereafter fixed by storage at room temperature for several hours. After fixing, the dyeings or prints are rinsed thoroughly with cold and hot water, optionally with the addition of a dispersant.

The dyes according to the invention are distinguished by high reactivity, good fixing capacity and very good build-up capacity. They can accordingly be used in the exhaust dyeing process at low dyeing temperatures and they require only short steaming times in the pad-steam process The degrees of fixing are high and unfixed dye can be washed off readily, the difference between the degree of exhaust and the degree of fixing being remarkably small, that is to say the soaping loss is very small. The dyes according to the invention are also especially suitable for printing, especially on cotton, but also for printing nitrogen-containing fibres, for example wool or silk or blend fabrics containing wool or silk.

The dyeings and prints produced using the dyes according to the invention have a high tinctorial strength and a high fibre-dye binding stability in both acidic and alkaline range, and they also have good fastness to light and very good wet fastness properties, such as fastness to washing, water, seawater, crossdyeing and to perspiration, as well as good fastness to pleating, to pressing and to rubbing.

The following Examples serve to illustrate the invention. The temperatures are given in degrees Celsius, parts are parts by weight, and the percentages relate to percent by weight, unless otherwise indicated. Parts by weight relate to parts by volume in a ratio of kilograms to liters.

EXAMPLE 1 a) 48.7 parts of 7-(4-aminophenylazo)-naphthalene-1,3,5-trisulfonic acid are sprinkled into 500 parts of water and the pH value is adjusted to 7 with sodium hydroxide solution. The resulting solution is cooled to 0° C. and 14 parts of trifluorotriazine are added dropwise thereto. During the dropwise addition, the pH value of the reaction mixture is maintained at 7 with sodium hydroxide solution. A neutralised solution of 7.5 parts of 1,2-diaminopropane in 100 parts of water is then added to the reaction mixture, the pH value of the reaction mixture is maintained at 6 with sodium hydroxide solution and the temperature of the reaction mixture is allowed to rise to room temperature. Once the reaction is complete, 200 parts of sodium chloride are added thereto and the resulting precipitate is filtered off, then washed with saturated sodium chloride solution and dried in vacuo at 60° C. to obtain 50 parts of a compound that in the form of the free acid corresponds to the formula

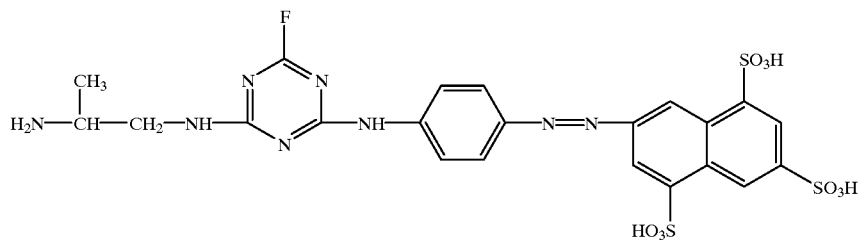

b) A neutral solution of 59.6 parts of the copper complex of 5-amino-3-[3-phenyl-5-(2-carboxy-5-sulfophenyl)-1-formazano]-4-hydroxybenzenesulfonic acid in 600 parts of water is prepared and cooled to 0° C.; 14 parts of trifluorotriazine are added dropwise to the solution while the pH value is maintained at 5 with sodium hydroxide solution. Once the reaction is complete, 65.7 parts of the compound prepared according to a) are added thereto, the pH value of the reaction mixture is increased to 8.5 and the temperature is raised to 20° C. Stirring is continued under those conditions until the condensation is complete; 120 parts of sodium chloride are added, and the resulting precipitate is filtered off, washed with saturated sodium chloride solution and dried in vacuo at 60° C. to obtain 110 parts of a compound that in the form of the free acid corresponds to formula (101) and dyes cotton in an olive-green shade having good all-round properties.

EXAMPLES 2 to 21

Analogously to the procedure described in Example 1 there are obtained, from the aminoazo dyes of formula

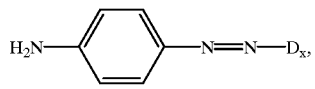

the diamines of formula $H_2N—B_x—NH_2$ and the copper-formazan complexes of formula $A_x—NH_2$, dyes that in the form of the free acid correspond to the general formula (101)

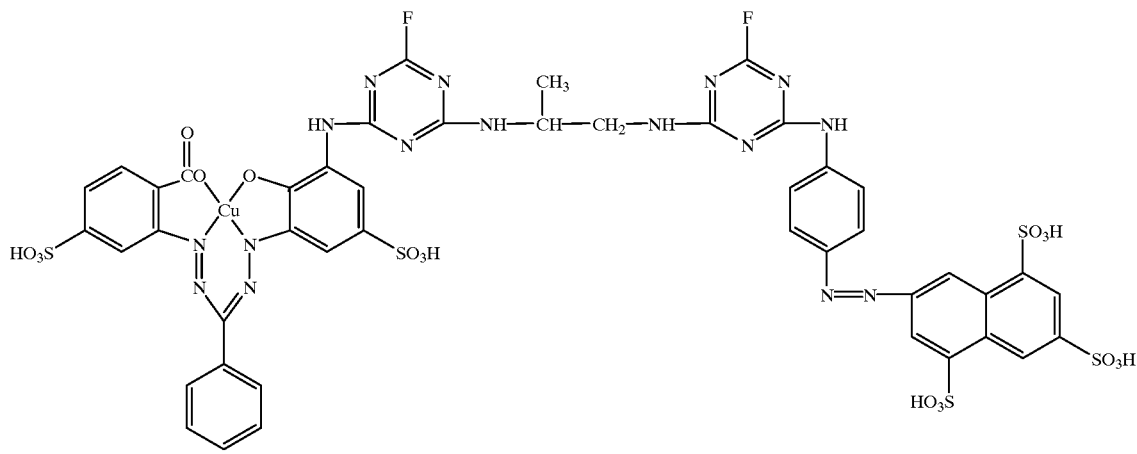

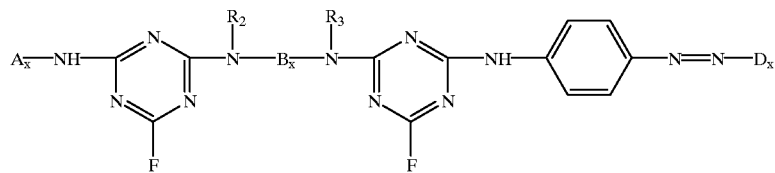

wherein $A_x$,

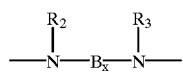

and $D_x$ are the radicals given in Table 1, and the radicals $A_x$ and $D_x$ given in Table 1 in each case correspond to the formulae given above. The dyes dye cotton in shades of green having good allround properties.

TABLE 1

| Ex. | $A_x$ | $-N(R_2)-B_x-N(R_3)-$ | $D_x$ |
|---|---|---|---|
| 2 | (3.1) | —NH—CH₂—CH₂—NH— | (5.11) |
| 3 | (3.1) | —NH—CH₂—CH₂—CH₂—NH— | (5.11) |
| 4 | (3.1) | —NH—CH₂—CH₂—N(CH₃)— | (5.11) |
| 5 | (3.1) | —N(CH₃)—CH₂—CH₂—N(CH₃)— | (5.11) |
| 6 | (3.1) | —NH—(CH₂)₂—NH—(CH₂)₂—NH— | (5.11) |
| 7 | (3.1) | —NH—(CH₂)₃—O—(CH₂)₄—O—(CH₂)₃—NH— | (5.11) |
| 8 | (3.1) | —NH—(CH₂)₂—O—(CH₂)₂—O—(CH₂)₂—NH— | (5.11) |
| 9 | (3.1) | —NH—CH₂—CH₂—N(CH₂CH₃)— | (5.11) |
| 10 | (3.1) | —NH—CH₂—CH₂—N(CH₂CH₂—OH)— | (5.11) |
| 11 | (3.1) | —NH—CH₂—C(CH₃)(CH₃)—CH₂—NH— | (5.11) |
| 12 | (3.1) | —NH—CH(C₂H₅)—CH₂—CH₂—NH— | (5.11) |
| 13 | (3.1) | —NH—CH₂—CH(OH)—CH₂—NH— | (5.11) |
| 14 | (3.1) | —NH—CH₂—CH(CH₃)—CH₂—CH₂—CH₂—NH— | (5.11) |
| 15 | (3.2) | —NH—CH(CH₃)—CH₂—NH— | (5.11) |
| 16 | (3.3) | —NH—CH(CH₃)—CH₂—NH— | (5.4) |
| 17 | (2.1) | —NH—CH(CH₃)—CH₂—NH— | (5.4) |
| 18 | (3.4) | —NH—CH(CH₃)—CH₂—NH— | (5.1) |
| 19 | (3.1) | —NH—CH(CH₃)—CH₂—NH— | (4.1) |

TABLE 1-continued

| Ex. | $A_x$ | $-\overset{R_2}{\underset{|}{N}}-B_{\overline{x}}-\overset{R_3}{\underset{|}{N}}-$ | $D_x$ |
|---|---|---|---|
| 20 | (3.1) | —NH—CH(CH₃)—CH₂—NH— | (4.12) |
| 21 | (3.1) | —NH—CH₂—CH₂—NH— | (5.10) |

Dyeing Procedure 2 parts of the reactive dye obtained according to Example 1 are dissolved in 400 parts of water; 1500 parts of a solution containing 53 g of sodium chloride per liter are added thereto. 100 parts of cotton fabric are placed in the dyebath at 40° C. After 45 minutes, 100 parts of a solution containing 16 g of sodium hydroxide and 20 g of calcined soda per liter are added thereto. The temperature of the dyebath is maintained at 40° C. for a further 45 minutes. The dyed goods are then rinsed, soaped at the boil for a quarter of an hour with a non-ionic detergent, rinsed again and dried.

Printing Procedure

While stirring rapidly, 3 parts of the reactive dye obtained according to Example 1 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, optionally soaped at the boil and rinsed again, and then dried.

What is claimed is:

1. A reactive dye of formula (1)

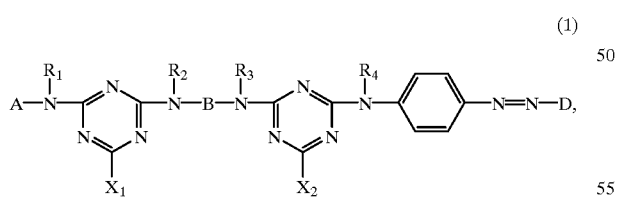

(1)

wherein $R_1$, $R_2$, $R_3$ and $R_4$ are each independently of the others hydrogen or unsubstituted or substituted $C_1$–$C_4$alkyl, $X_1$ and $X_2$ are halogen, B is a $C_2$–$C_{12}$alkylene radical which may be interrupted by 1, 2 or 3 —O— members and is unsubstituted or substituted by hydroxy, A is a formazan radical of formula (2) or (3)

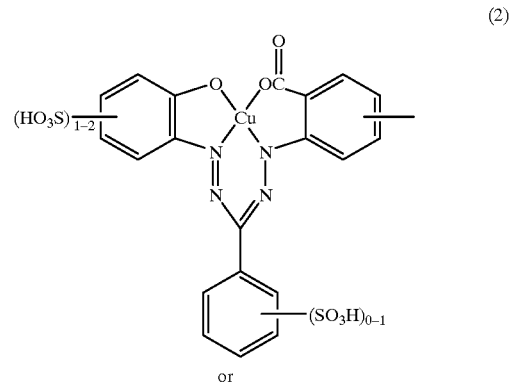

(2)

or

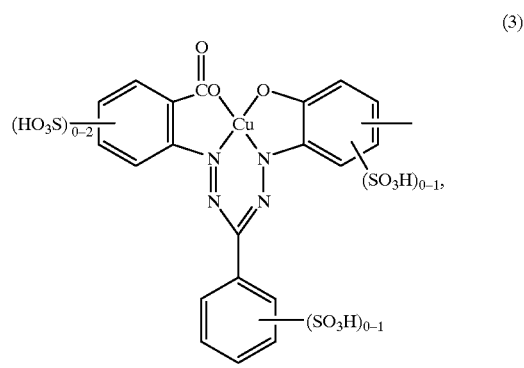

(3)

D is a radical of formula (4) or (5)

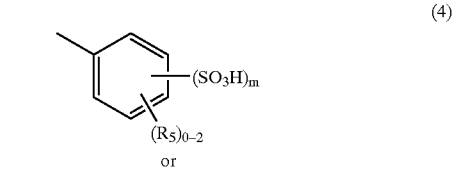

(4)

or

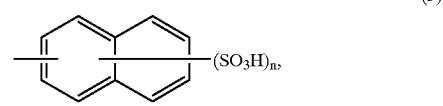

(5)

wherein
m is the number 1 or 2,
n is the number 1, 2 or 3 and
$(R_5)_{0-2}$ denotes from 0 to 2 identical or different substituents from the group $C_1$–$C_4$alkyl, $C_1$–$C_4$alkoxy, $C_2$–$C_4$alkanoylamino and halogen.

2. A reactive dye according to claim 1, wherein $R_1$, $R_2$, $R_3$ and $R_4$ are each independently of the others hydrogen or unsubstituted or hydroxy-, sulfo-, sulfato-, cyano- or carboxy-substituted $C_1$–$C_4$alkyl.

3. A reactive dye according to claim 1, wherein $R_1$, $R_2$, $R_3$ and $R_6$ are hydrogen.

4. A reactive dye according to claim 1, wherein $X_1$ and $X_2$ are chlorine or fluorine.

5. A reactive dye according to claim 1, wherein

B is a radical of formula —$CH_2$—$CH(R_6)$— or —$(R_6)$CH—$CH_2$—, wherein $R_6$ is $C_1$–$C_4$alkyl.

6. A reactive dye according to claim 1, wherein

A is a radical of formula (3.1)

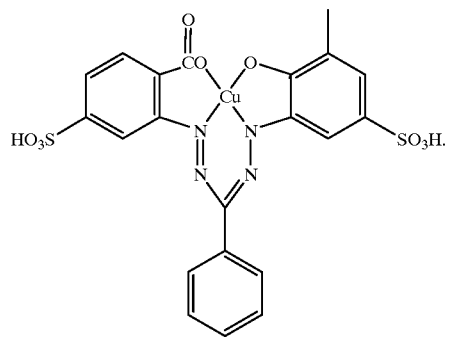

(3.1)

7. A reactive dye according to claim 1, wherein

D is a radical of formula (5a)

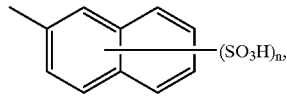

(5a)

wherein n is the number 2 or 3.

8. A reactive dye according to claim 1, wherein $R_1$, $R_2$, $R_3$ and $R_4$ are hydrogen, $X_1$ and $X_2$ are chlorine or fluorine, B is a radical of formula —$CH_2$—$CH(R_6)$— or —$(R_6)$CH—$CH_2$—, wherein $R_6$ is $C_1$–$C_4$alkyl, A is a radical of formula (3.1)

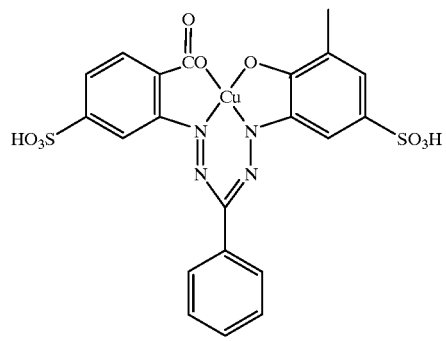

(3.1)

and

D is a radical of formula (5a)

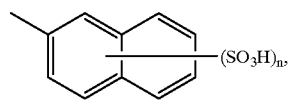

(5a)

wherein n is the number 2 or 3.

9. A reactive dye according to claim 1, wherein the dye of formula (1) is a dye of formula (1.1)

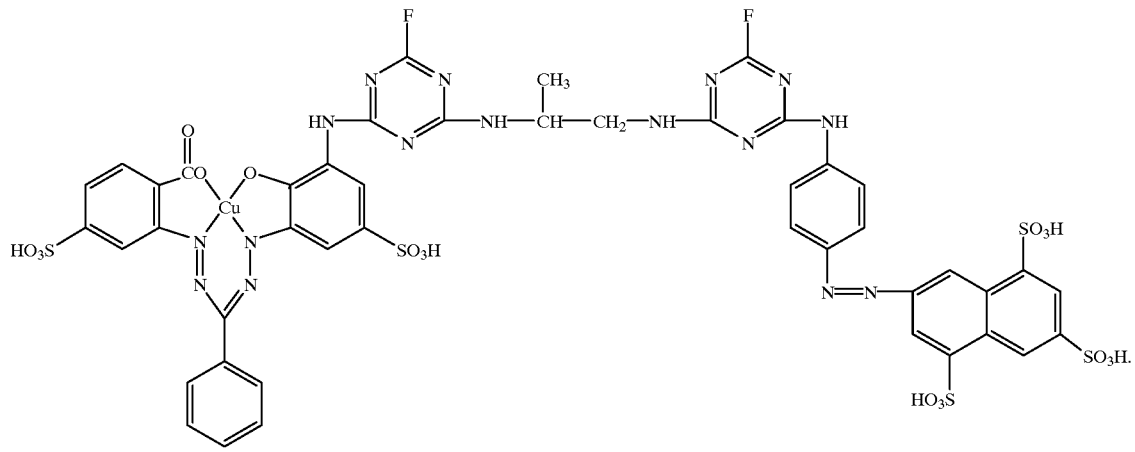

(1.1)

10. A process for the preparation of a reactive dye of formula (1) according to claim 1, which process comprises condensing a compound of formula (6a)

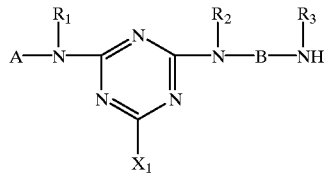
(6a)

with a compound of formula (7a)

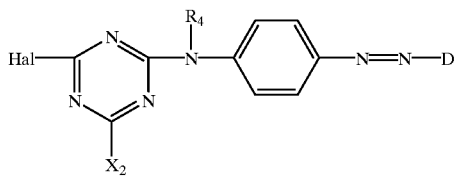
(7a)

or condensing a compound of formula (6b)

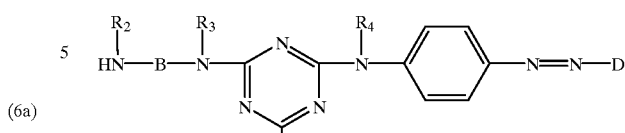
(6b)

with a compound of formula (7b)

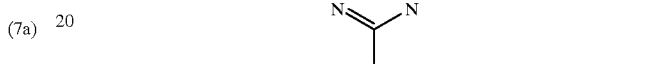
(7b)

wherein Hal is halogen, and A, B, $X_1$, $X_2$, $R_1$, $R_2$, $R_3$ and $R_4$ are as defined in claim 1.

11. A process for dyeing or printing hydroxy-group-containing or nitrogen-containing fiber materials, which comprises applying to said materials a reactive dye according to claim 1.

* * * * *